United States Patent
Sakashita et al.

(10) Patent No.: US 8,427,389 B2
(45) Date of Patent: Apr. 23, 2013

(54) MOBILE COMMUNICATION DEVICE AND METHOD FOR ASSEMBLING THE MOBILE COMMUNICATION DEVICE

(75) Inventors: Hiroaki Sakashita, Kawasaki (JP); Tatsuhito Araki, Kawasaki (JP); Hiroaki Matsuda, Kawasaki (JP); Takehisa Ishikawa, Kawasaki (JP); Takashi Suzuki, Kawasaki (JP); Kouki Murakami, Kawasaki (JP); Hidehiko Hizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 12/872,242

(22) Filed: Aug. 31, 2010

(65) Prior Publication Data

US 2011/0210902 A1 Sep. 1, 2011

(30) Foreign Application Priority Data

Sep. 1, 2009 (JP) ................. 2009-202067

(51) Int. Cl.
*H01Q 1/12* (2006.01)
*H01Q 1/30* (2006.01)
*H01Q 1/32* (2006.01)

(52) U.S. Cl.
USPC ........................ 343/878; 343/707; 343/718

(58) Field of Classification Search .................. 343/878, 343/707, 713–717, 718, 866
See application file for complete search history.

(56) References Cited

U.S. PATENT DOCUMENTS

| | | | | |
|---|---|---|---|---|
| 6,054,954 A | * | 4/2000 | Eggleston et al. | 343/700 MS |
| 7,541,992 B2 | * | 6/2009 | Murakami et al. | 343/702 |
| 2002/0070903 A1 | * | 6/2002 | Nakamura et al. | 343/702 |
| 2005/0003874 A1 | * | 1/2005 | Ebisawa et al. | 455/575.7 |
| 2006/0033673 A1 | * | 2/2006 | Cupples | 343/878 |
| 2006/0256032 A1 | * | 11/2006 | Pourseyed et al. | 343/906 |
| 2007/0021159 A1 | * | 1/2007 | Kaneoya | 455/575.3 |
| 2007/0241971 A1 | * | 10/2007 | Tsujimura et al. | 343/702 |
| 2008/0001833 A1 | * | 1/2008 | Kaneoya | 343/702 |
| 2010/0137040 A1 | * | 6/2010 | Kaito | 455/575.3 |
| 2012/0129582 A1 | * | 5/2012 | Hongo et al. | 455/575.3 |

FOREIGN PATENT DOCUMENTS

| | | | |
|---|---|---|---|
| JP | 7-29945 | * | 6/1995 |
| JP | 7-29945 U | | 6/1995 |

* cited by examiner

*Primary Examiner* — Shawki Ismail
*Assistant Examiner* — Dylan White
(74) *Attorney, Agent, or Firm* — Fujitsu Patent Center

(57) ABSTRACT

A mobile terminal device includes a circuit board accommodated in a casing and an antenna disposed on the outside of the casing electrically connected to each other via a opening formed in the casing, a first conductive member fixed to an inner surface of the casing while being connected to the circuit board, a second conductive member detachably attached to an outer surface of the casing while being connected to the antenna, and a conductive fastening member fitted into the opening from outside the casing and fastening the first conductive member and the second conductive member together.

12 Claims, 14 Drawing Sheets

MOBILE COMMUNICATION DEVICE AND METHOD FOR ASSEMBLING THE MOBILE COMMUNICATION DEVICE

CROSS-REFERENCE TO RELATED APPLICATIONS

This application is based upon and claims the benefit of priority of the prior Japanese Patent Application No. 2009-202067, filed on Sep. 1, 2009, the entire contents of which are incorporated herein by reference.

FIELD

The present invention relates to mobile communication devices and method for assembling the mobile communication device.

BACKGROUND

To date, mobile terminal devices such as cellular phones have included antennas inside casings thereof or outside the casings. When an antenna is disposed on the outside of a casing, the antenna is connected to a circuit board accommodated in the casing using a feeder line.

FIG. 13 is a schematic perspective view illustrating a part of the structure inside a casing of a known mobile terminal device. FIG. 14 is a longitudinal sectional view illustrating a part of the casing illustrated in FIG. 13. A mobile terminal device illustrated in FIGS. 13 and 14 includes a casing 103 formed of a first case 101 and a second case 102 joined together and having a through-hole 104 formed in a sidewall 103a thereof. A circuit board 105 on which various electronic components are mounted is accommodated in the casing 103.

An antenna 106 is formed of a flexible cable such as a flexible printed circuit (FPC). A first end of the antenna 106 is connected to a connector 107 on the circuit board 105 inside the casing 103. A second end of the antenna 106 extends to the outside of the casing 103 through the through-hole 104, and is held by a predetermined holder 108.

An elastic waterproofing grommet 109 is integrated with the antenna 106 at a predetermined position. The through-hole 104 is watertightly sealed by the grommet 109. An outer cover 110 is attached to the outside of the casing 103 so as to prevent exposure of the antenna 106.

The antenna 106 of the mobile terminal device shown in FIGS. 13 and 14 is formed on the flexible cable. The mobile terminal device shown in FIGS. 13 and 14 uses parts such as the connector 107 on the circuit board 105 and the holder 108 for fixing the flexible cable.

Japanese Laid-Open Utility Model Publication No. 7-29945 describes a metallic telescopic antenna instead of an antenna formed on a flexible cable. In J Japanese Laid-Open Utility Model Publication No. 7-29945, the telescopic antenna disposed on the outside of a casing and a connecting terminal accommodated in the casing are connected to each other via a through-hole formed in the casing.

In Japanese Laid-Open Utility Model Publication No. 7-29945, the connecting terminal is attached to the inside of the casing, and a base end of the telescopic antenna is attached to the inside of the casing. The connecting terminal and the base end of the telescopic antenna are fastened together by a conductive screw member fitted into the through-hole from inside the casing.

SUMMARY

According to an aspect of the invention, a mobile communication device includes a circuit board accommodated in a casing and an antenna disposed on the outside of the casing electrically connected to each other via an opening formed in the casing, a first conductive member fixed to an inner surface of the casing while being connected to the circuit board, a second conductive member detachably attached to an outer surface of the casing while being connected to the antenna, and a conductive fastening member fitted into the opening from outside the casing and fastening the first conductive member and the second conductive member together.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Figure 13:
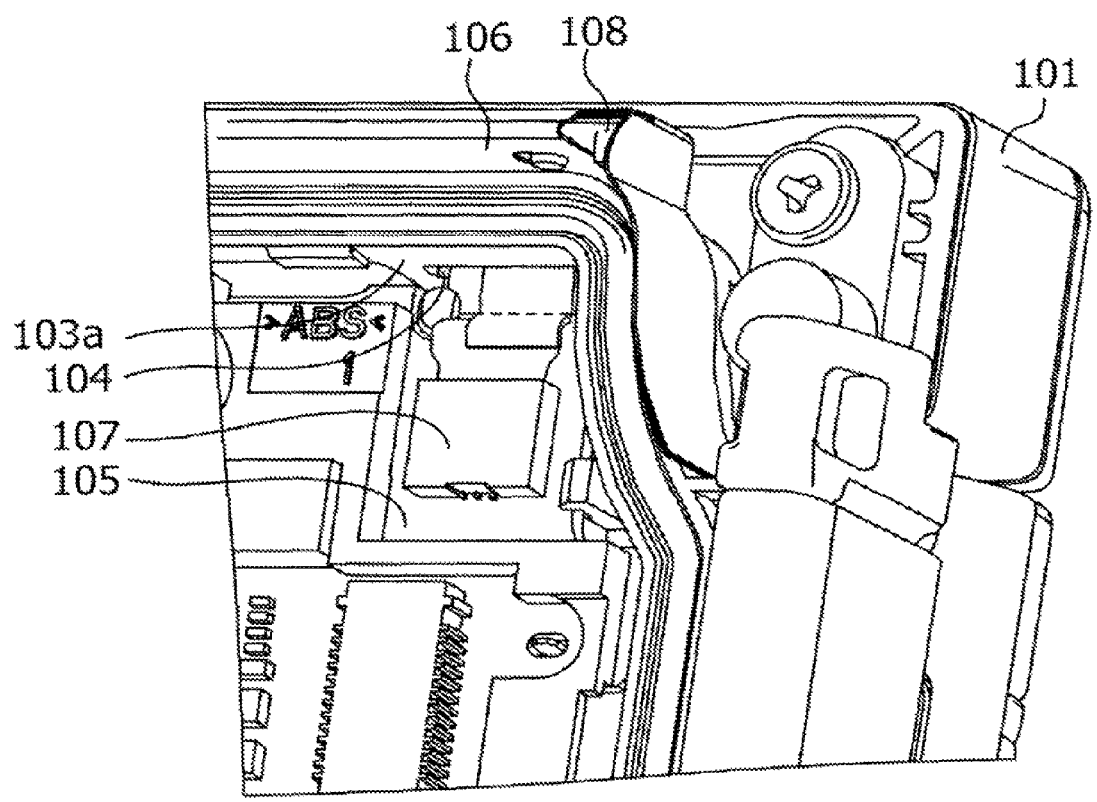
FIG. 13 is a schematic perspective view illustrating a part of the structure inside a casing of a known mobile terminal device.
Figure 14:
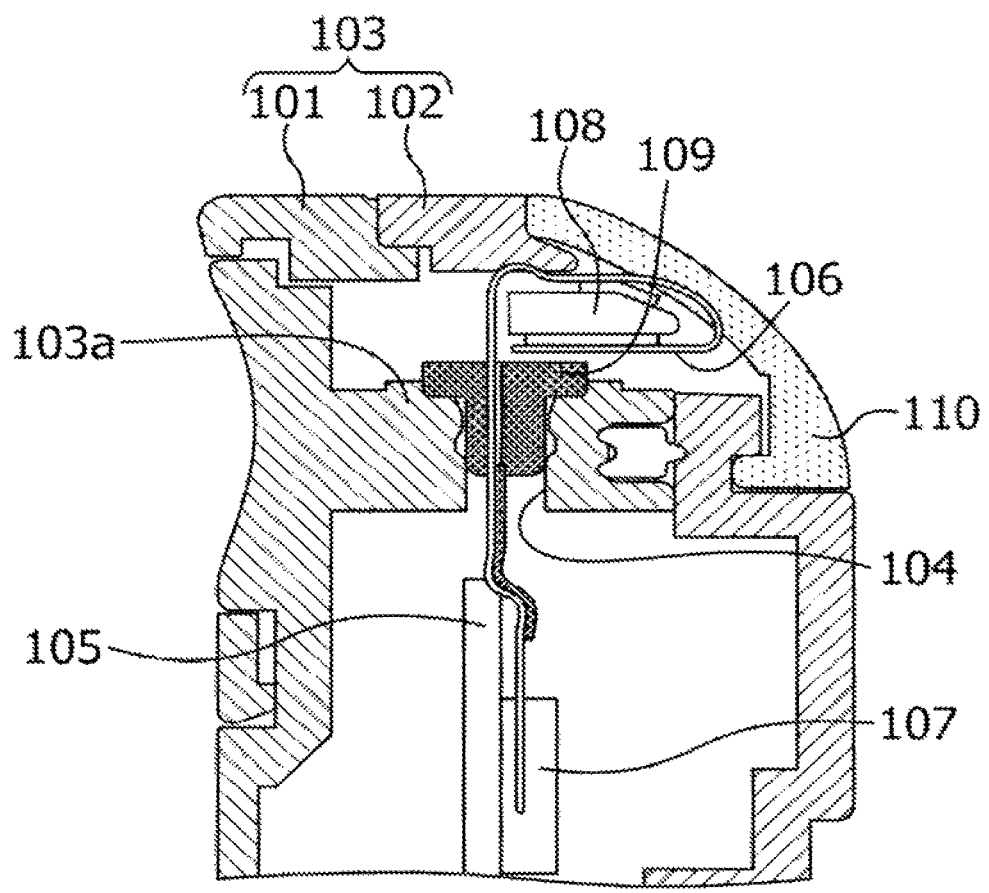
FIG. 14 is a longitudinal sectional view illustrating a part of the casing illustrated in FIG. 13.

The mobile terminal device as described earlier and shown in FIGS. 13 and 14 requires a large number of parts and large mounting spaces. As for the telescopic antenna of the mobile terminal device described in Japanese Unexamined Utility Model Registration Application Publication No. 7-29945, such an antenna cannot be easily replaced when the telescopic antenna disposed on the outside of the casing is broken.

Also, in the mobile terminal device described in Japanese Laid-Open Utility Model Publication No. 7-29945, the circuit board inside the casing and the telescopic antenna outside the casing are screwed together from inside the casing. Therefore, the casing needs to be disassembled and the screw member needs to be removed in order to remove the telescopic antenna from the casing. In this manner, replacement of the telescopic antenna of the mobile terminal device described in Japanese Laid-Open Utility Model Publication No. 7-29945 is complicated. In addition, when the casing of the mobile terminal device described in Japanese Laid-Open Utility Model Publication No. 7-29945 has a waterproofing function, the waterproof property may be degraded due to disassembling of the casing A mobile communication device according to an embodiment of the present invention will now be described with reference to the drawings.

Figure 1:
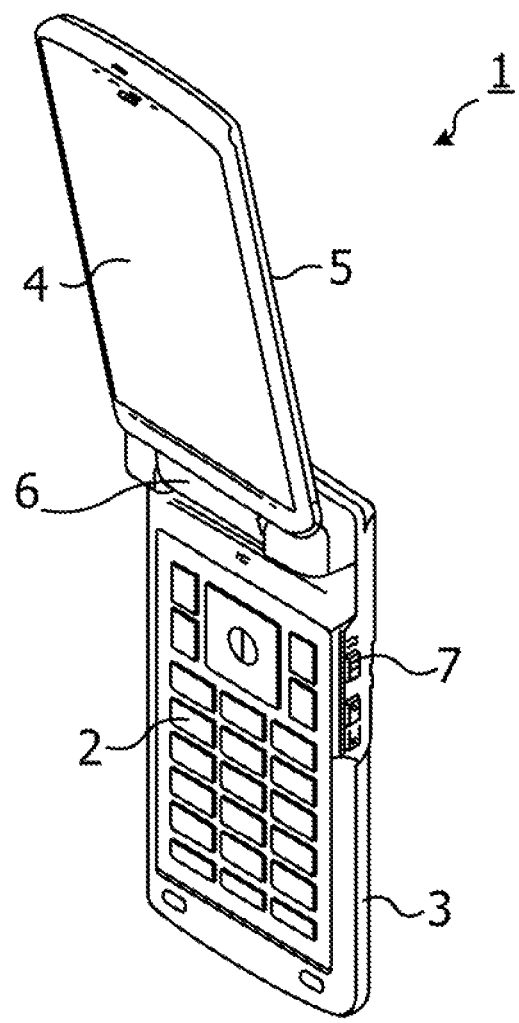
FIG. 1 is a schematic perspective view of a cellular phone according to this embodiment viewed from the front side.
Figure 2:
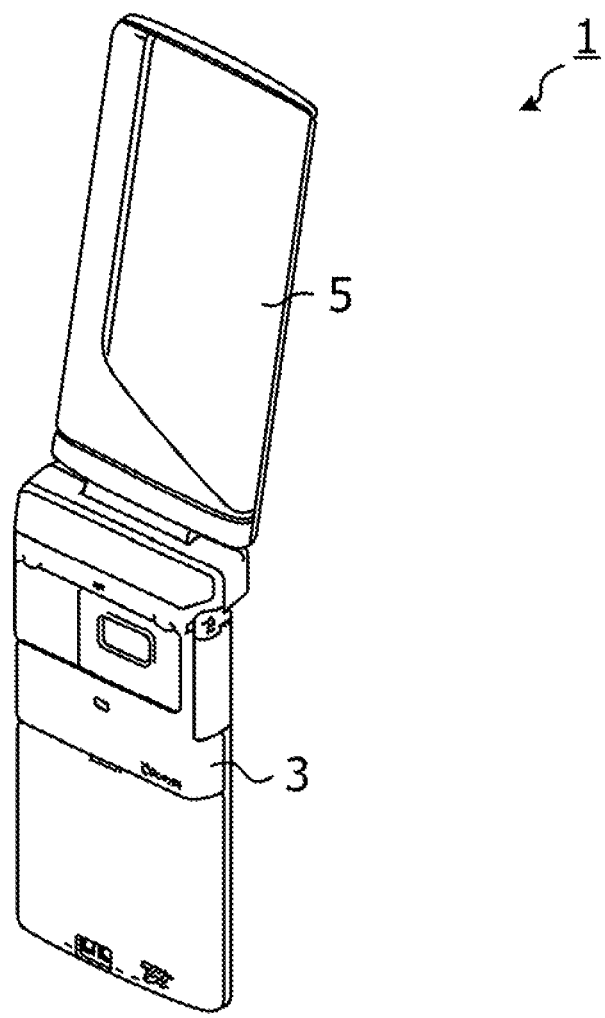
FIG. 2 is a schematic perspective view of the cellular phone according to this embodiment viewed from the rear side.

The mobile communication terminal device according to this embodiment of the present invention is incorporated into a foldable cellular phone. FIG. 1 is a schematic perspective view of the cellular phone according to this embodiment viewed from the front side. FIG. 2 is a schematic perspective view of the cellular phone according to this embodiment viewed from the rear side.

As shown in FIGS. 1 and 2, a cellular phone 1 includes a fixed casing 3 having an operation section 2 and a movable casing 5 having a display section 4. The fixed casing 3 and the movable casing 5 are joined together by a joint 6 so as to be foldable. For example, the fixed casing 3 and the movable casing 5 are composed of lightweight and high-strength materials such as magnesium alloys, and have box shapes. Various side keys 7 are formed at a side surface of the fixed casing 3.

Figure 3:
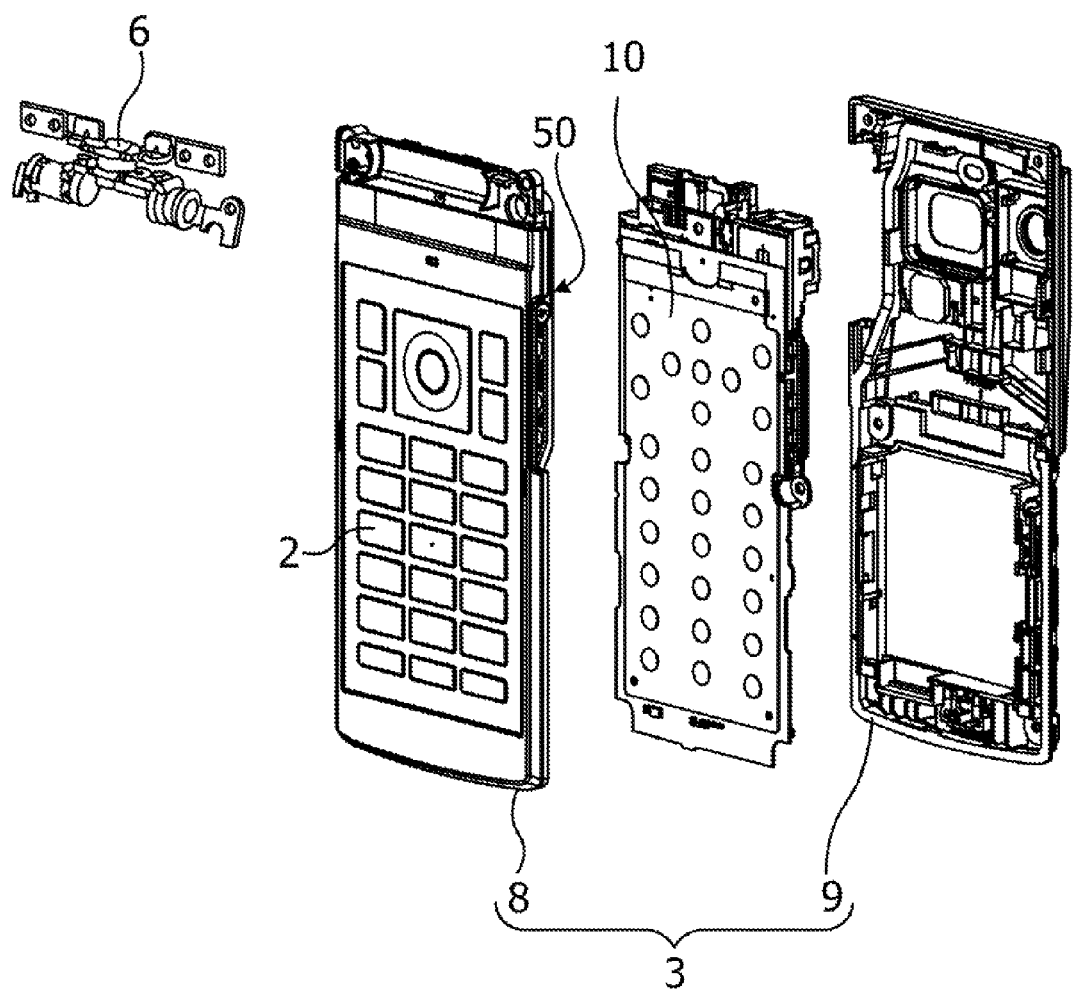
FIG. 3 is an exploded perspective view of a fixed casing.

FIG. 3 is an exploded perspective view of the fixed casing 3. As shown in FIG. 3, the fixed casing 3 has a two-part structure including a front case 8 on which the operation section 2 is formed and a rear case 9 located at the rear side of the front case 8 joined together. A circuit board 10 on which various electronic components are mounted is accommodated in the fixed casing 3 including the front case 8 and the rear case 9. The circuit board 10 has a feeding terminal portion (not shown) at a predetermined position thereof. The feeding terminal portion is brought into contact with a spring terminal 54a of a first conductive member 51 (see FIG. 7) included in a connecting portion 50 (described below).

The joint 6 that joins the fixed casing 3 and the movable casing 5 together such that the movable casing is foldable is disposed on the outside of the fixed casing 3, more specifically, on the outside of the front case 8 of the fixed casing 3. The joint 6 is a hinge module composed of a material having an electrical conductivity such as metals. The joint 6 is electrically connected to the circuit board 10 accommodated in the fixed casing 3 using the connecting portion 50. The joint 6 functions as an antenna of the cellular phone 1 when power is fed from the circuit board 10.

An antenna hole 8a (see FIG. 5) serving as an opening, such as a through-hole, is formed in a side surface of the front case 8 of the fixed casing 3. The connecting portion 50 that joins the joint 6 serving as the antenna and the circuit board 10 together is attached to the antenna hole 8a.

Figure 4:
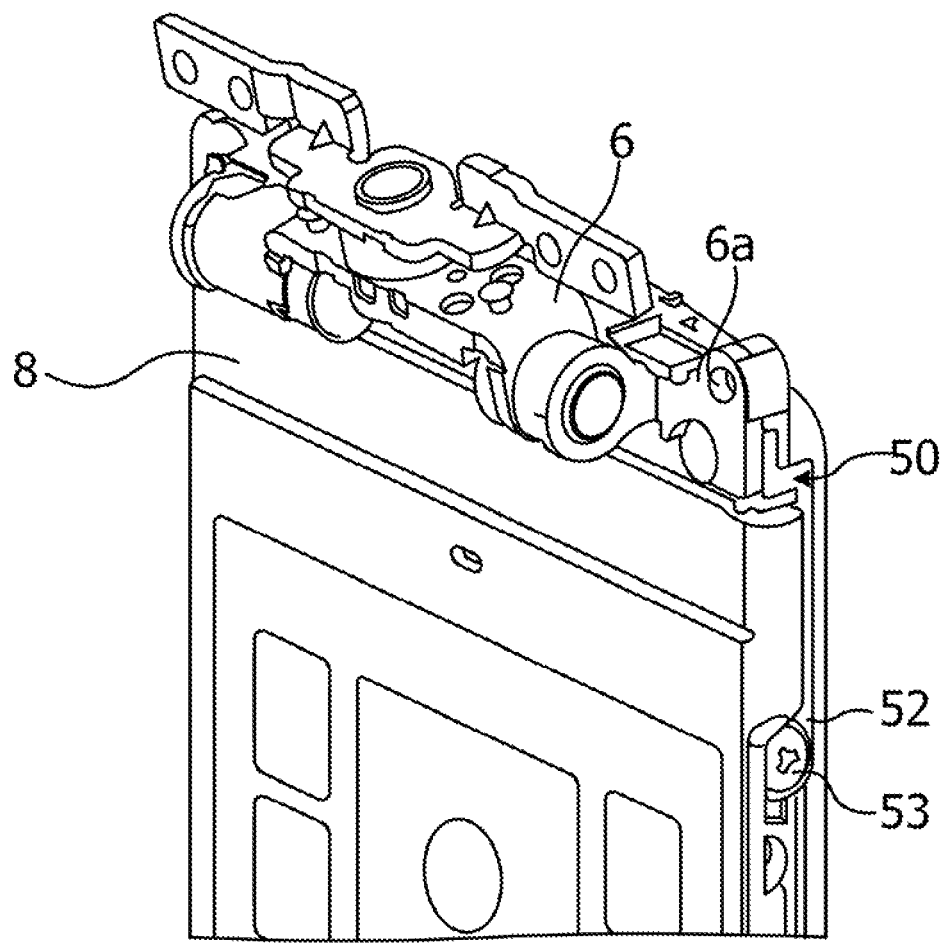
FIG. 4 is a perspective view illustrating how a connecting portion is attached.
Figure 5:
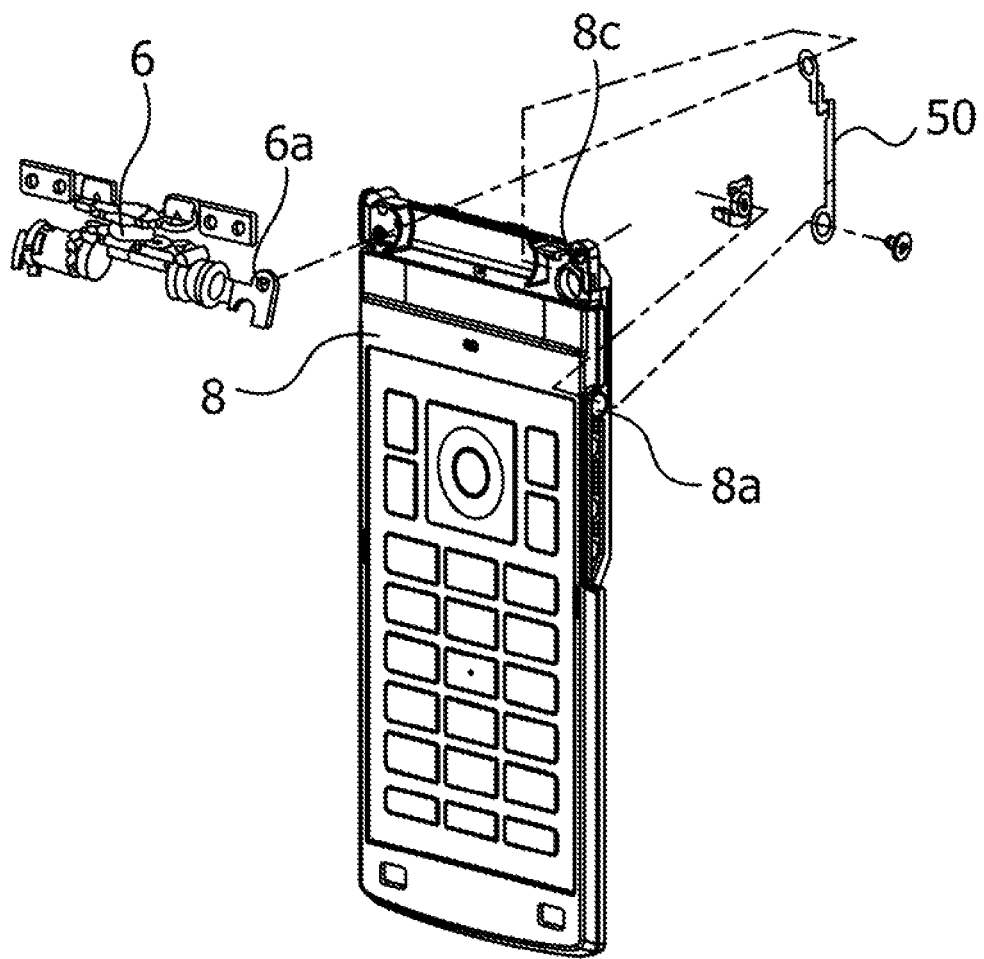
FIG. 5 is an exploded perspective view of FIG. 4.
Figure 6:
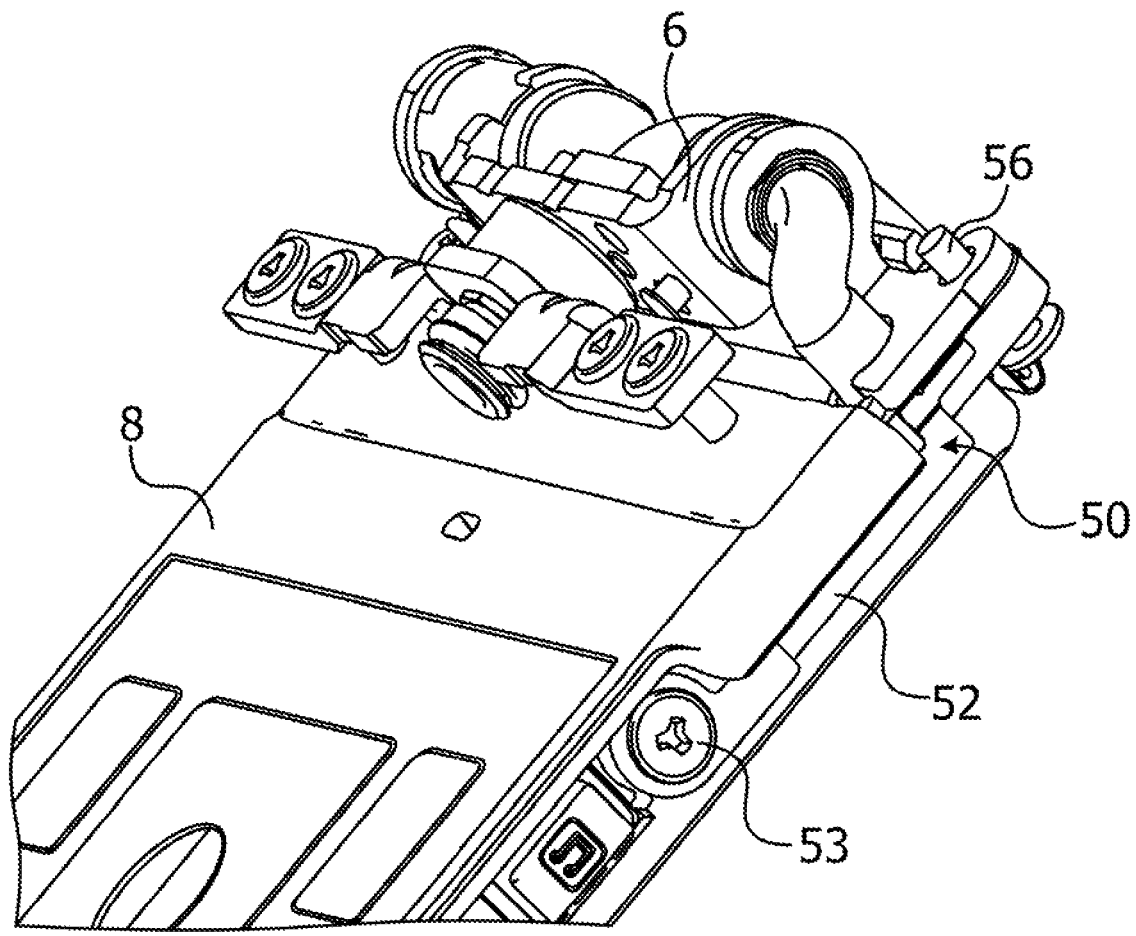
FIG. 6 is an enlarged perspective view of a principal part viewed from outside the front case illustrating how the connecting portion is attached.
Figure 7:
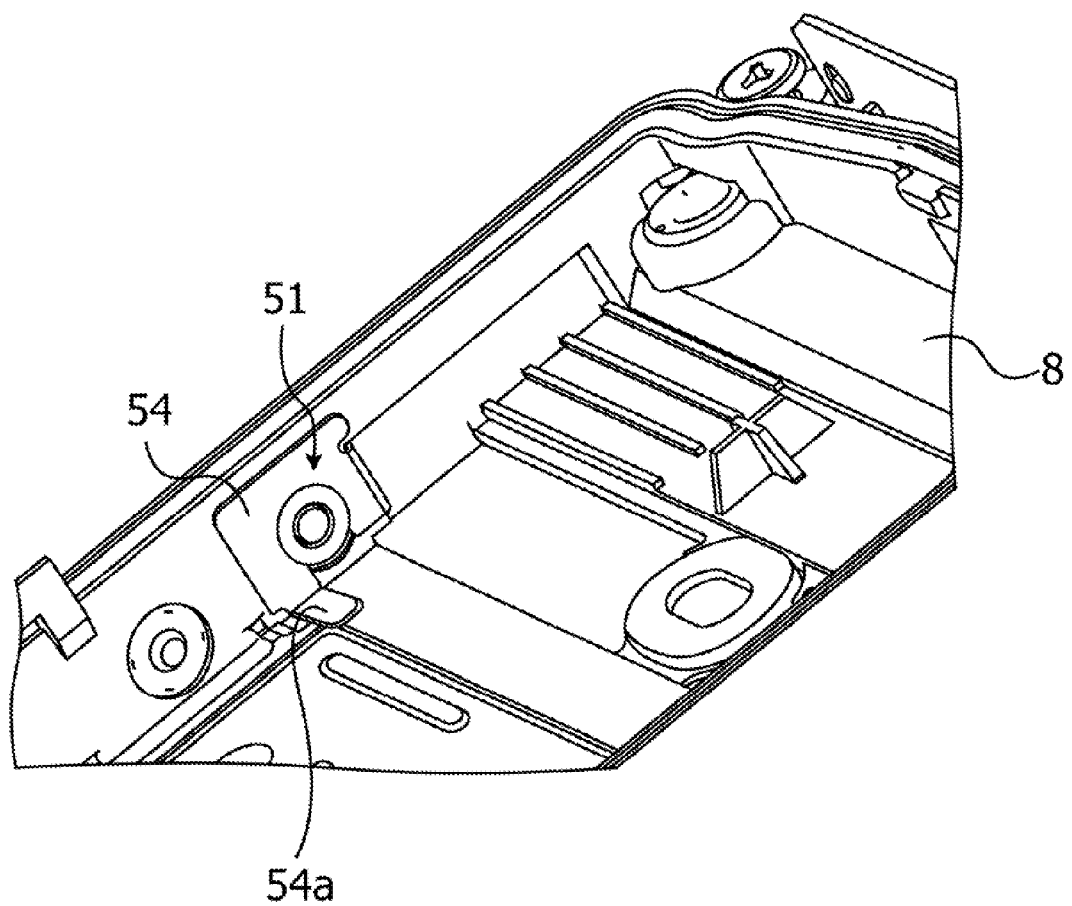
FIG. 7 is an enlarged perspective view of a principal part viewed from inside the front case illustrating how the connecting portion is attached.

The structure of the connecting portion 50 that joins the joint 6 and the circuit board 10 together will now be described in detail. FIG. 4 is a perspective view illustrating how a connecting portion 50 is attached. FIG. 5 is an exploded perspective view of FIG. 4. FIG. 6 is an enlarged perspective view of a principal part viewed from outside the front case 8 illustrating how the connecting portion 50 is attached. FIG. 7 is an enlarged perspective view of a principal part viewed from inside the front case 8 illustrating how the connecting portion 50 is attached.

Figure 8:
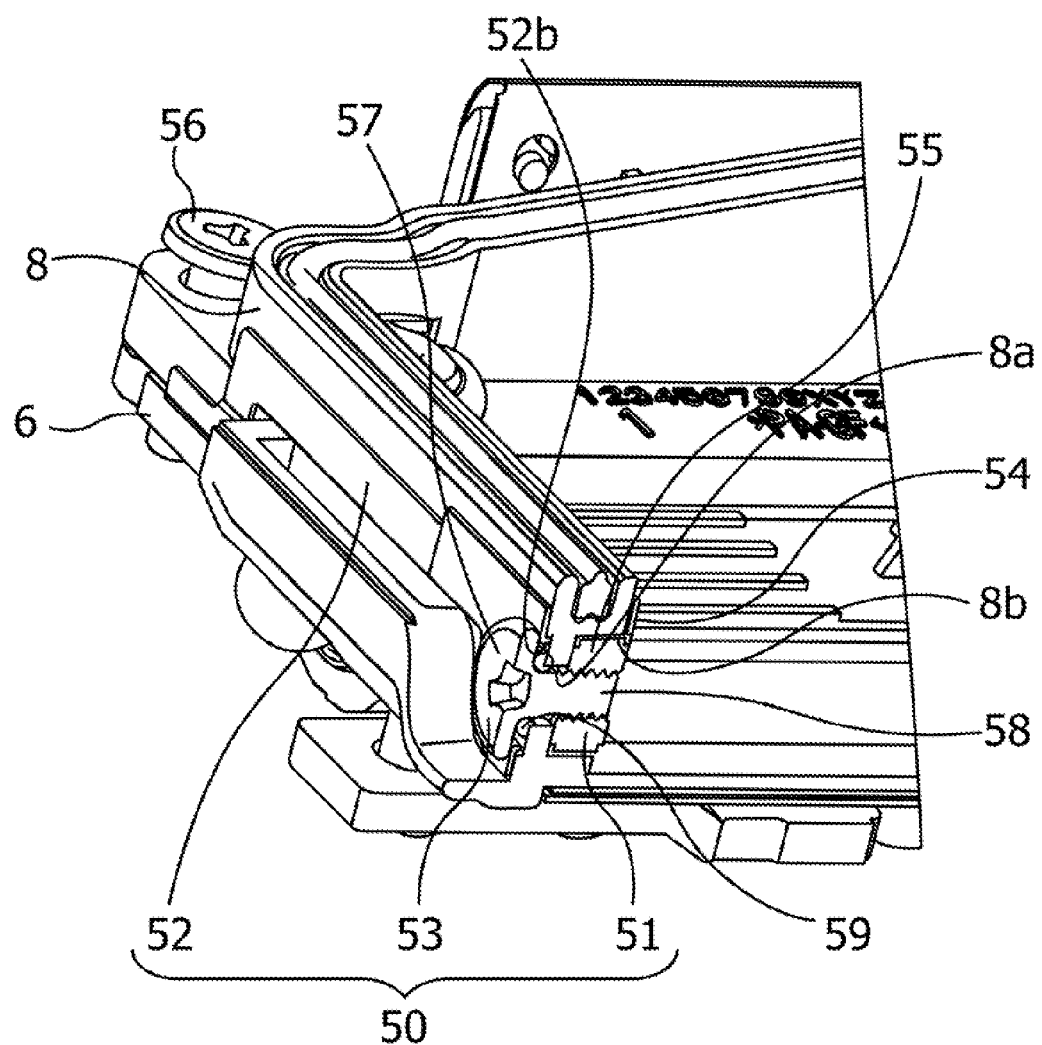
FIG. 8 is a sectioned perspective view viewed from outside the front case illustrating how the connecting portion is attached.
Figure 9:
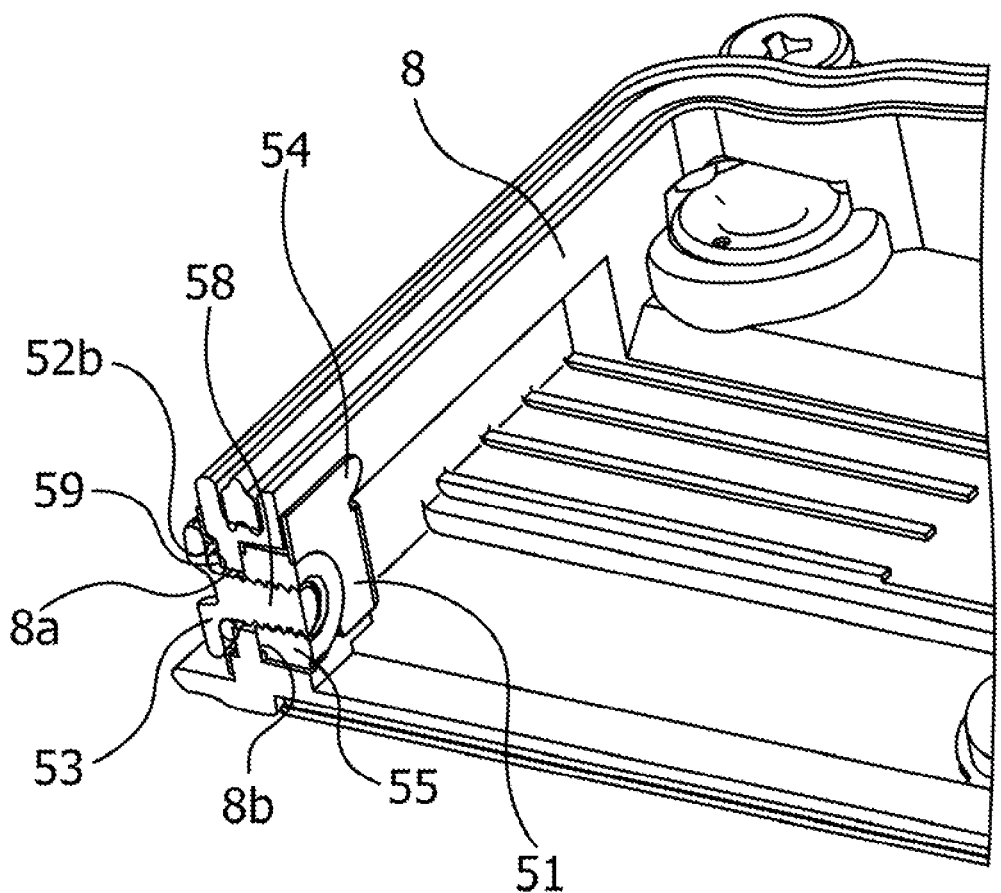
FIG. 9 is a sectioned perspective view viewed from inside the front case illustrating how the connecting portion is attached.

FIG. 8 is a sectioned perspective view viewed from outside the front case 8 illustrating how the connecting portion 50 is attached. FIG. 9 is a sectioned perspective view viewed from inside the front case 8 illustrating how the connecting portion 50 is attached.

As shown in FIGS. 4 to 9, the connecting portion 50 includes the first conductive member 51, a second conductive member 52, and a conductive fastening member 53. The first conductive member 51 is fixed to an inner surface of the fixed casing 3, and is connected to the circuit board 10 (see FIG. 3). In this embodiment, the first conductive member 51 is fixed to an inner surface of the front case 8 of the fixed casing 3, and connected to the circuit board 10.

Figure 10:
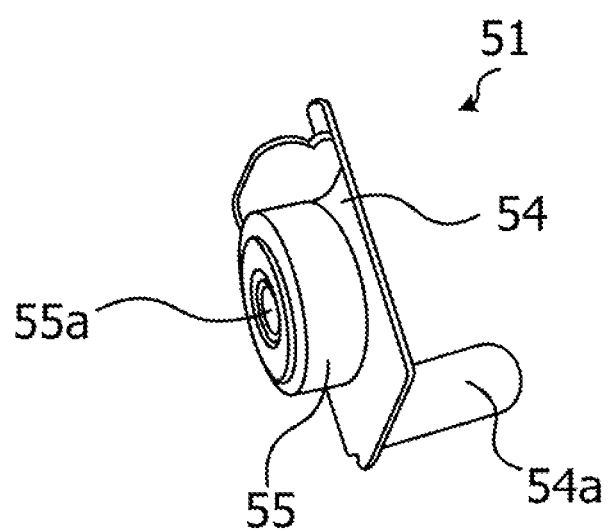
FIG. 10 is an enlarged perspective view of a first conductive member.

FIG. 10 is an enlarged perspective view of the first conductive member 51. As shown in FIG. 10, the first conductive member 51 includes, for example, a metal sheet 54 composed of, for example, a conductive material such as copper or stainless steel and a nut portion 55 welded to the metal sheet 54. The metal sheet 54 includes the spring terminal 54a serving as a contact terminal brought into contact with the feeding terminal portion (not shown) of the circuit board 10, and is disposed along the inner surface of the front case 8. The nut portion 55 is fitted into a recessed portion 8b (see FIGS. 8 and 9) formed in the inner surface of the front case 8 around the periphery of the antenna hole 8a. The first conductive member 51 is fixed to the inner surface of the front case 8 of the fixed casing 3, and connected to the circuit board 10.

The second conductive member 52 is detachably attached to an outer surface of the fixed casing 3, and connected to the joint 6 having the antenna function. In this embodiment, the second conductive member 52 is detachably attached to an outer surface of the front case 8 of the fixed casing 3, and connected to the joint 6.

Figure 11:
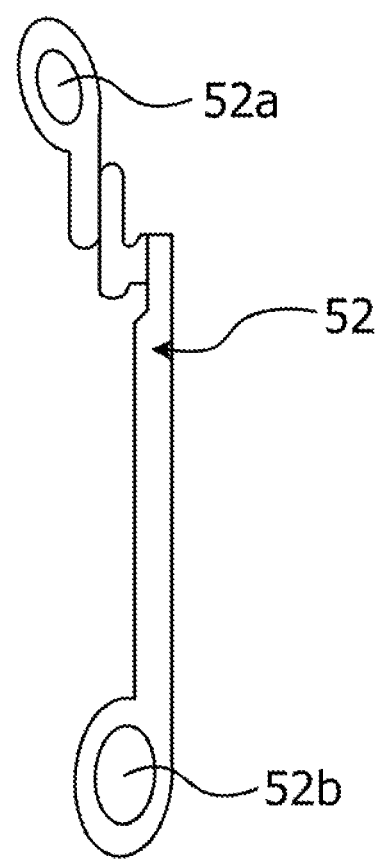
FIG. 11 is an enlarged perspective view of a second conductive member.

FIG. 11 is an enlarged perspective view of the second conductive member 52. As shown in FIG. 11, the second conductive member 52 is a sheet-metal structure composed of, for example, a conductive material such as copper or stainless steel. The second conductive member 52 has a bent strip-like shape extending from the joint 6 to the antenna hole 8a of the front case 8 along the outer surface of the front case 8.

A via hole 52a is formed in a first end of the second conductive member 52 adjacent to the joint 6. The first end of the second conductive member 52 is clamped between the joint 6 and the front case 8 by a fixing screw 56 while the via hole 52a is disposed so as to be concentric with a via hole 8c formed in the front case 8 and a via hole 6a formed in the joint 6 (see FIG. 5). The second conductive member 52 is detachably attached to the outer surface of the front case 8 of the fixed casing 3, and connected to the joint 6.

A via hole 52b corresponding to the antenna hole 8a is formed in a second end of the second conductive member 52 adjacent to the antenna hole 8a. A screw portion 58 (described below) of the fastening member 53 is fitted into the via hole 52b.

The fastening member 53 is fitted into the antenna hole 8a from outside the fixed casing 3 so as to fasten the first conductive member 51 and the second conductive member 52 together. The fastening member 53 is fitted into the antenna hole 8a from the outer surface of the front case 8 of the fixed casing 3 so as to fasten the first conductive member 51 and the second conductive member 52 together.

Figure 12:
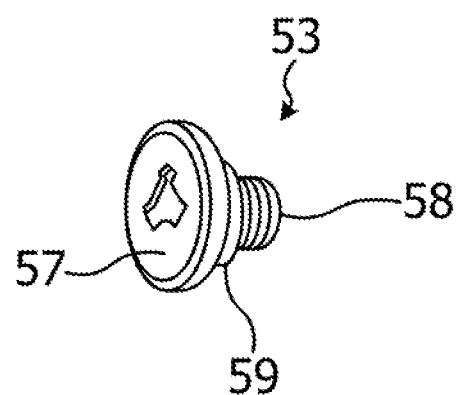
FIG. 12 is an enlarged perspective view of a fastening member.

FIG. 12 is an enlarged perspective view of the fastening member 53. The fastening member 53 shown in FIG. 12 is composed of, for example, a conductive material such as copper or stainless steel. The fastening member 53 includes a head 57 having a diameter larger than that of the antenna hole 8a of the front case 8 and the screw portion 58 screwable into a screw hole 55a in the nut portion 55 of the first conductive member 51 (see FIG. 10). The screw portion 58 protrudes from the head 57.

The screw portion 58 of the fastening member 53 is fitted into the via hole 52b in the second conductive member 52 and the antenna hole 8a in sequence. The second conductive member 52 is pushed toward the outer surface of the front case 8 by the head 57 of the fastening member 53. The screw portion 58 of the fastening member 53 is screwed into the screw hole 55a in the nut portion 55 of the first conductive member 51. The first conductive member 51 and the second conductive member 52 are fastened together using the fastening member 53. The circuit board 10 accommodated in the fixed casing 3 and the joint 6 having the antenna function disposed on the outside of the fixed casing 3 are electrically connected to each other using the first conductive member 51, the fastening member 53, and the second conductive member 52.

An O ring 59 serving as a waterproof member is attached on the screw portion 58 of the fastening member 53 at a base end thereof. The O ring 59 watertightly seals the antenna hole 8a of the front case 8 when the first conductive member 51 and the second conductive member 52 are fastened together by the fastening member 53. Water may be prevented from entering the fixed casing 3 by sealing the antenna hole 8a using the O ring 59.

Procedures for connecting the joint 6 and the circuit board 10 to each other using the connecting portion 50 and those for severing the connection between the joint 6 and the circuit board 10 using the connecting portion 50 will now be described with reference to FIGS. 4, 5, 8, and 9. First, procedures for connecting the joint 6 and the circuit board 10 to each other using the connecting portion 50 will be described.

(1) The nut portion 55 of the first conductive member 51 is fitted into the recessed portion 8b formed in the inner surface of the front case 8 around the periphery of the antenna hole 8a.

(2) The first end of the second conductive member 52 adjacent to the joint 6 is clamped between the joint 6 and the front case 8 using the fixing screw 56.

(3) The via hole 52b in the second conductive member 52 at the second end is disposed so as to be concentric with the antenna hole 8a of the front case 8 while the second conductive member 52 is placed on the outer surface of front case 8.

(4) The screw portion 58 of the fastening member 53 is fitted into the via hole 52b in the second conductive member 52 and the antenna hole 8a in sequence from outside the front case 8.

(5) The screw portion 58 is screwed into the screw hole 55a in the nut portion 55 of the first conductive member 51 while the second conductive member 52 is pushed toward the outer surface of the front case 8 using the head 57 of the fastening member 53.

(6) The rear case 9 is joined to the front case 8 so that the fixed casing 3 is assembled while the circuit board 10 is accommodated in the front case 8 such that the feeding terminal portion is brought into contact with the spring terminal 54a of the first conductive member 51. In this manner, the joint 6 serving as the antenna disposed on the outside of the fixed casing 3 and the circuit board 10 accommodated in the fixed casing 3 can be connected to each other using the connecting portion 50.

Next, procedures for severing the connection between the joint 6 and the circuit board 10 using the connecting portion 50 will be described.

(1) The screw portion 58 of the fastening member 53 is detached from the screw hole 55a in the nut portion 55 of the first conductive member 51, and the fastening member 53 is pulled out of the via hole 52b in the second conductive member 52 and the antenna hole 8a.

(2) The joint 6 and the first end of the second conductive member 52 adjacent to the joint 6 are separated from each other by removing the fixing screw 56. In this manner, the joint 6 serving as the antenna disposed on the outside of the fixed casing 3 and the circuit board 10 accommodated in the fixed casing 3 may be disconnected from each other.

In this embodiment, the first conductive member 51 connected to the circuit board 10 is fixed to the inner surface of the fixed casing 3, and the second conductive member 52 connected to the joint 6 serving as the antenna is attached to the outer surface of the fixed casing 3. The first conductive member 51 and the second conductive member 52 are fastened together using the fastening member 53 fitted into the antenna hole 8a from outside the fixed casing 3. The joint 6 and parts such as the second conductive member 52 disposed on the outside of the fixed casing 3 may be easily replaced without disassembling the fixed casing 3 into the front case 8 and the rear case 9. Furthermore, this embodiment may ensure the waterproof property.

In this embodiment, the device includes the O ring 59 that watertightly seals the antenna hole 8a in the fixed casing 3 when the first conductive member 51 and the second conductive member 52 are fastened together by the fastening member 53. Water may be prevented from entering the fixed casing 3 from the antenna hole 8a, and the waterproof property may be further improved.

In this embodiment, the O ring 59 is attached to the fastening member 53. The antenna hole 8a may be watertightly sealed by fastening the first conductive member 51 and the second conductive member 52 together. Parts outside the fixed casing 3 may be efficiently replaced, and the waterproof property can be improved.

In this embodiment, the first conductive member 51 includes the metal sheet 54 including the spring terminal 54a that is brought into contact with the circuit board 10 and the nut portion 55 fitted into the recessed portion 8b formed in the inner surface of the fixed casing 3 around the periphery of the antenna hole 8a. The nut portion 55 is attached to the metal sheet 54. The fastening member 53 includes the head 57 having a diameter larger than that of the antenna hole 8a and the screw portion 58 protruding from the head 57 and being screwable into the screw hole 55a in the nut portion 55. The screw portion 58 protrudes from the head 57. The fastening member 53 fastens the first conductive member 51 and the second conductive member 52 together when the screw portion 58 fitted into the antenna hole 8a is screwed into the screw hole 55a in the nut portion 55 while the head 57 pushes the second conductive member 52 attached to the outer surface of the fixed casing 3 toward the outer surface of the fixed casing 3.

In this embodiment, the joint 6 and parts such as the second conductive member 52 disposed on the outside of the fixed casing 3 may be easily replaced by detaching/attaching the screw portion 58 of the fastening member 53 from/to the nut portion 55 of the first conductive member 51. This leads to efficient part handling.

In addition to the above-described embodiment, various embodiments are possible within the technical scope of the present invention described in the claims.

In this embodiment, the joint 6 that joins the fixed casing 3 and the movable casing 5 together such that the movable casing is foldable functions as an antenna. However, the device may include an antenna separately from the joint 6. In this case, the connecting portion 50 electrically connects the antenna and the circuit board 10.

In this embodiment, the present invention is incorporated into a foldable cellular phone using a hinge module. However, the present invention may be incorporated into foldable cellular phones using various hinge modules in addition to the illustrated hinge module. Furthermore, in addition to the foldable type using a hinge module, the present invention may also be incorporated into, for example, cellular phones whose movable casings may be moved with respect to the fixed casings using slidable or rotatable joints.

In this embodiment, the present invention is incorporated into a cellular phone serving as a mobile communication device. However, the present invention is not limited to this, and may also be incorporated into other various mobile communication devices such as small information processing terminals such as personal digital assistants (PDAs), small music players, portable televisions, and portable video game players.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile communication device comprising:
   a casing;
   a circuit board accommodated in the casing;
   an antenna disposed on an outside of the casing and electrically connected to the circuit board via a first opening formed in the casing;
   a first conductive member attached to an inner surface of the casing and connected to the circuit board;
   a second conductive member attached to an outer surface of the casing and connected to the antenna; and
   a conductive fastening member fitted into the first opening from the side of the second conductive member to the side of the first conductive member and fastening the first conductive member and the second conductive member together,
   wherein the second conductive member includes a second opening at an opposite end of the conductive fastening member so as to attach the second conductive member to the outer surface of the casing using the second opening.

2. The mobile communication device according to claim 1, further comprising a waterproof member that seals, in a watertight manner, the first opening while the first conductive member and the second conductive member are fastened together by the fastening member.

3. The mobile communication device according to claim 2, wherein the waterproof member is attached to the fastening member.

4. The mobile communication device according to claim 1, wherein the first conductive member includes a metal sheet including a connecting terminal that is brought into contact with the circuit board and a nut portion attached to the metal sheet and fitted into a recessed portion formed in the inner surface of the casing around the periphery of the first opening.

5. The mobile communication device according to claim 4, wherein the fastening member includes a head having a diameter larger than a diameter of the first opening and a screw portion protruding from the head and being screwable into a screw hole in the nut portion, and fastens the first conductive member and the second conductive member together when the screw portion fitted into the first opening is screwed into the screw hole in the nut portion while the head pushes the second conductive member attached to the outer surface of the casing toward the outer surface of the casing.

6. The mobile communication device according to claim 1, wherein the first conductive member includes a metal sheet having a connecting terminal that is brought into contact with the circuit board and a nut portion attached to the metal sheet and fitted into a recessed portion formed in the inner surface of the casing around the periphery of the first opening.

7. The mobile communication device according to claim 6, wherein the second conductive member includes a bent strip-like shape extending from the antenna to the first opening along the outer surface of the casing, and includes a via hole corresponding to the first opening at an end of the second conductive member adjacent to the first opening.

8. The mobile communication device according to claim 7, wherein the fastening member includes a head having a diameter larger than a diameter of the first opening and a screw portion protruding from the head and being screwable into a screw hole in the nut portion, and fastens the first conductive member and the second conductive member together when the screw portion fitted into the via hole and the first opening in sequence is screwed into the screw hole in the nut portion while the head pushes the second conductive member attached to the outer surface of the casing toward the outer surface of the casing.

9. The mobile communication device according to claim 1, wherein the antenna is a conductive joint that joins the casing and another casing together such that the casings are movable with respect to each other.

10. A method for assembling a mobile communication device comprising:
    accommodating a circuit board inside a casing;
    disposing an antenna on an outside of the casing;
    electrically connecting the antenna to the circuit board via a first opening formed in the casing;
    attaching a first conductive member to an inner surface of the casing and connecting the first conductive member to the circuit board;
    attaching a second conductive member to an outer surface of the casing and connecting the second conductive member to the antenna; and
    fitting a conductive fastening member into the first opening from the side of the second conductive member to the side of the first conductive member so as to fasten the first conductive member and the second conductive member together,
    wherein the second conductive member includes a second opening at an opposite end of the conductive fastening member so as to attach the second conductive member to the outer surface of the casing using the second opening.

11. The method according to claim 10, further comprising:
    sealing, in a watertight manner, the first opening while the first conductive member and the second conductive member are fastened together by the fastening member.

12. The method according to claim 11, wherein sealing, in a watertight manner, includes sealing the opening with a waterproof member that is attached to the fastening member.

* * * * *